No. 620,256. Patented Feb. 28, 1899.
S. H. SHORT.
MEANS FOR SUSPENDING ELECTRIC MOTORS.
(Application filed June 15, 1898.)

(No Model.) 2 Sheets—Sheet 1.

WITNESSES:

INVENTOR:—
Sidney H. Short.
BY
ATTORNEY

No. 620,256. Patented Feb. 28, 1899.
S. H. SHORT.
MEANS FOR SUSPENDING ELECTRIC MOTORS.
(Application filed June 15, 1898.)
(No Model.) 2 Sheets—Sheet 2.

WITNESSES:

INVENTOR
Sidney H. Short.
BY
H. B. Brownell.
ATTORNEY

UNITED STATES PATENT OFFICE.

SIDNEY H. SHORT, OF CLEVELAND, OHIO.

MEANS FOR SUSPENDING ELECTRIC MOTORS.

SPECIFICATION forming part of Letters Patent No. 620,256, dated February 28, 1899.

Application filed June 15, 1898. Serial No. 683,458. (No model.)

*To all whom it may concern:*

Be it known that I, SIDNEY H. SHORT, a citizen of the United States, residing at Cleveland, Ohio, have invented certain new and useful Improvements in Means for Suspending Electric Motors, of which the following is a full, clear, and exact description.

My improvement relates to means for suspending electric motors for propelling wheeled vehicles, and has for its object to provide means which shall have simplicity and general efficiency and permit the adjustment of the motor toward and from the driven axle, so that gears of different sizes may be easily substituted for one another, and also to obtain other desirable ends, as will hereinafterward appear.

The following is a description of apparatus embodying my improvement, reference being had to the accompanying drawings, in which—

Figure 1:
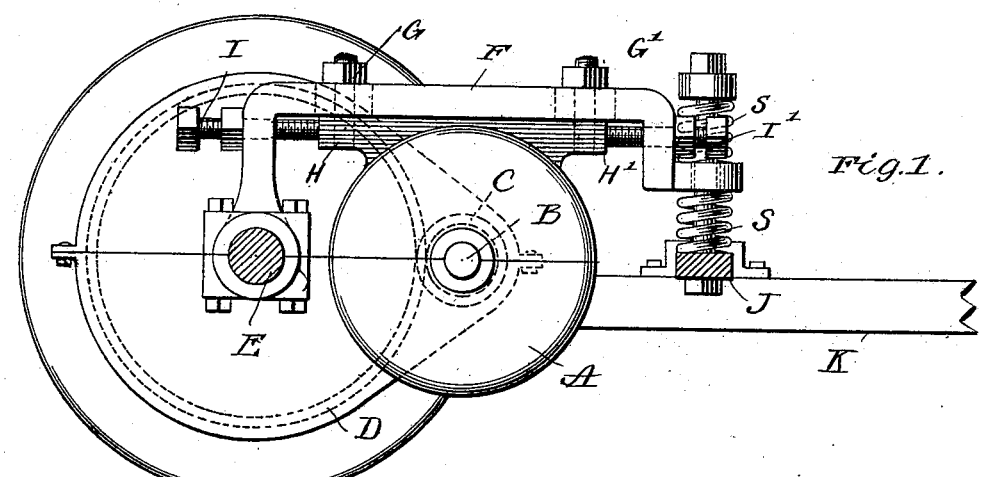
Figure 2:
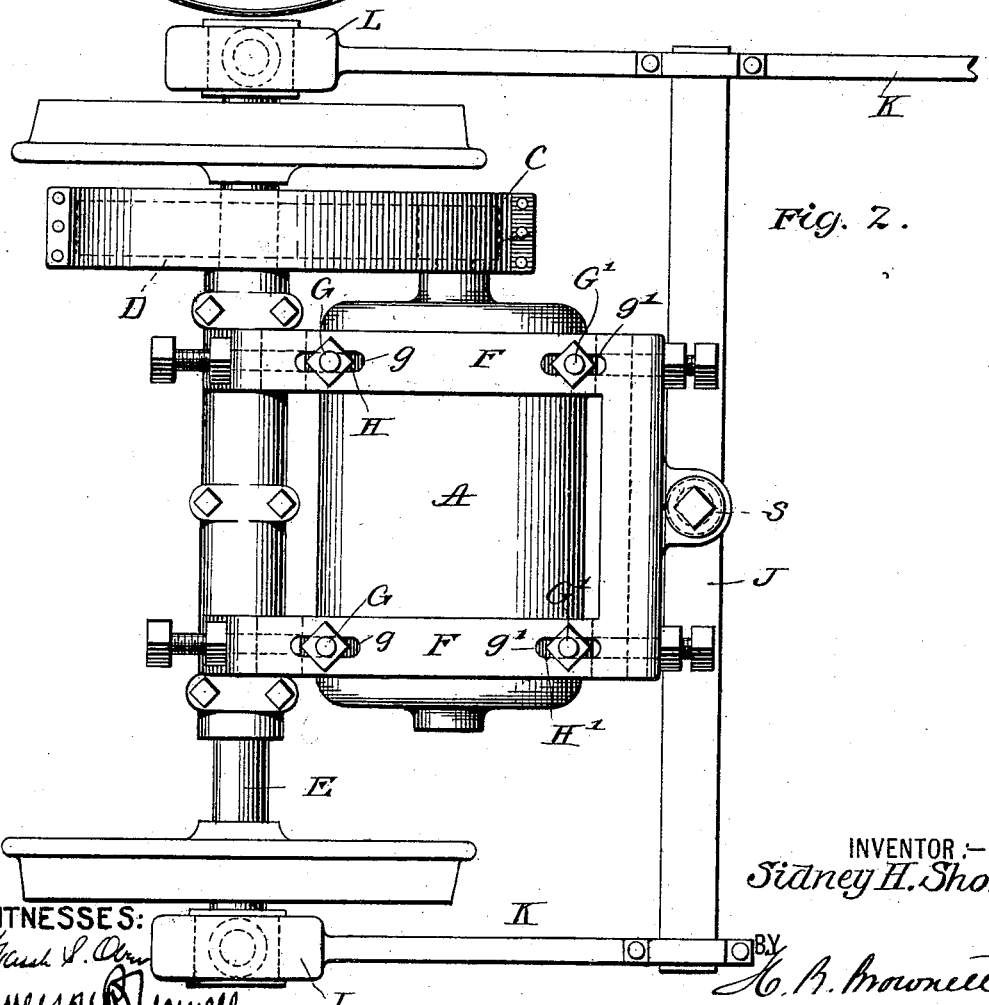
Figure 3:
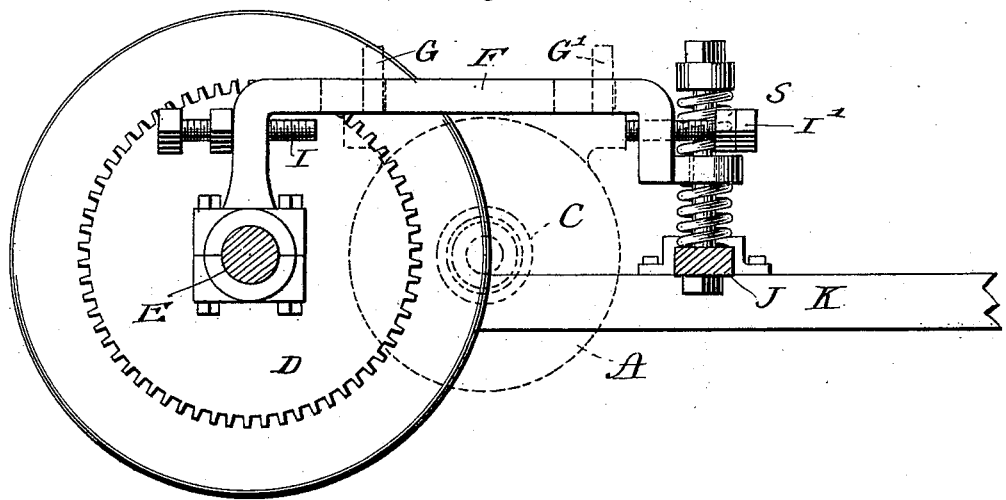
Figure 4:
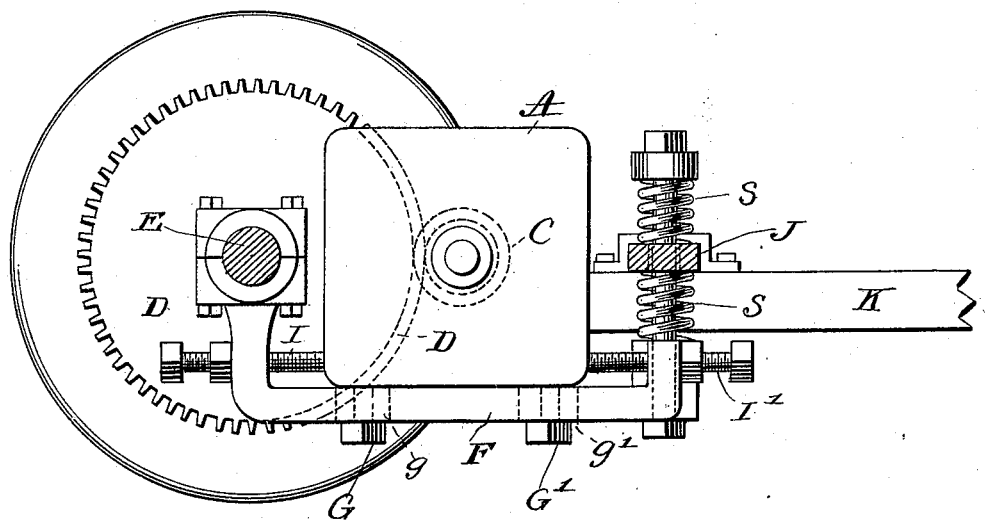

Figure 1 represents a side elevation, partly in section, of a portion of a vehicle, showing the motor suspended thereon in accordance with my invention. Fig. 2 is a plan view of the same. Fig. 3 is a side elevation, partly in section, with the gear-casing removed and the motor being shown in dotted lines removed somewhat from its normal position, so that the gears no longer mesh. Fig. 4 is a side elevation, partly in section, showing a modification embodying some of the features of my invention.

Referring in detail to the drawings, A represents the field-magnet of an electric motor, to which the bearings for the armature-shaft are directly connected, the motor being preferably of the iron-clad type and having the armature-bearings made integral with the field-magnet core.

B is an armature-shaft carrying a small gear C, which meshes with a large gear D, attached to the driven axle E.

F is a frame journaled at one end on the driven axle E and held in position at the other end by springs S S, one of which serves to cushion any upward thrust of the frame, while the other spring supports the end of the frame remote from the axle, being itself supported by the cross-bar J, which in turn is supported by the truck-frame K, carried at L by the axles in the usual manner. To this frame F the motor is attached bodily by bolts G G', passing through slots $g$ $g'$ into lugs H H', preferably integral with the motor-casing. The slots $g$ $g'$ permit the adjustment of the motor toward or from the driven axle E, so that a larger or smaller gear can be substituted for either of the gears D C without necessitating anything but the adjustment of the motor toward or from the axle, as permitted by the slots G G'.

I I' are set-screws bearing against the ends of the lugs H H', serving to assist in the accurate adjustment of the motor and in securing the same in place.

In the embodiment shown in Figs. 1, 2, and 3 the frame F is above the motor, which permits the motor to be detached and easily lowered into the pit in the car-house in case it is necessary to repair or examine the same. With this construction one motor can be removed and another can be substituted with very little delay or disturbance of the other parts.

In Fig. 4 of the drawings the frame F is shown as being beneath the motor A. It has, however, the same advantages of adjustment by reason of the slots $g$ $g'$, through which the bolts G G' pass, and also permits of the use of the set-screws I I' for securing the accurate adjustment. In other respects the arrangement is substantially the same. That shown in Fig. 4 is a desirable construction in that with this arrangement the bolts G G', while they hold the motor in position upon the frame F, do not have to support its weight.

What I claim as my invention is—

1. In a wheeled vehicle in combination a frame journaled at one end upon the driven axle and spring-supported at the other end from an independent support, and a motor attached thereto provided with means for adjusting the motor toward or from the driven axle, substantially as described.

2. In a wheeled vehicle in combination a frame journaled at one end upon the driven axle and spring-supported at the other end from an independent support, a motor-casing attached thereto, and supporting the armature, said armature connected by gearing to the driven axle, said frame being located above said motor, substantially as described.

3. In a wheeled vehicle in combination a separate and independent frame journaled upon the driven axle at one end and spring-supported from the truck at the other end, and a motor attached to, and removable as a whole from the under side of, said frame and having its armature-shaft geared to the driven axle of the vehicle, substantially as described.

4. In a wheeled vehicle in combination a frame journaled upon the driven axle and spring-supported at a distance therefrom from an independent support, a motor-casing attached thereto, and supporting the armature, said armature connected by gearing to the driven axle, said frame being located with reference to said motor so that the same can be removed as a whole from one side of said frame, substantially as described.

Signed at Cleveland, Ohio, this 13th day of June, 1898.

SIDNEY H. SHORT.

Witnesses:
M. A. KENSINGER,
JOHN J. BEVER.